(12) United States Patent
Bazile et al.

(10) Patent No.: US 10,908,292 B2
(45) Date of Patent: Feb. 2, 2021

(54) SYSTEM AND METHOD FOR AIDING THE LANDING OF AN AIRCRAFT

(71) Applicant: Airbus Operations S.A.S., Toulouse (FR)

(72) Inventors: Jerôme Bazile, Leguevin (FR); Patrice Rouquette, Pompertuzat (FR); Sylvain Raynaud, Cornebarrieu (FR); Nicolas Marconnet, Castelnau D'estretefonds (FR); Guillaume Discours, Pibrac (FR); Kevin Etchebarne, Toulouse (FR)

(73) Assignee: Airbus Operations S.A.S.

( * ) Notice: Subject to any disclaimer, the term of this patent is extended or adjusted under 35 U.S.C. 154(b) by 177 days.

(21) Appl. No.: 16/143,714

(22) Filed: Sep. 27, 2018

(65) Prior Publication Data
US 2019/0113593 A1    Apr. 18, 2019

(30) Foreign Application Priority Data

Oct. 17, 2017   (FR) .................................... 17 59739

(51) Int. Cl.
*G01S 19/15* (2010.01)
*B64D 45/04* (2006.01)
(Continued)

(52) U.S. Cl.
CPC .............. *G01S 19/15* (2013.01); *B64D 45/04* (2013.01); *G01S 1/022* (2013.01); *G01S 1/026* (2013.01);
(Continued)

(58) Field of Classification Search
CPC ........ G08G 5/02; G08G 5/025; G08G 5/0021; G01C 23/00; G01C 23/005; G01S 13/882;
(Continued)

(56) References Cited

U.S. PATENT DOCUMENTS 3,757,338 A * 9/1973 Liebman .................. G01S 1/02
  342/411
3,946,358 A * 3/1976 Bateman .............. G05D 1/0607
  340/970
(Continued)

FOREIGN PATENT DOCUMENTS

EP          3 166 093 A1    5/2017

OTHER PUBLICATIONS

ANPC, "Solution to false capture", Aug. 26, 2014, 4 pages, downloaded from: http://www.anpc.com/solution-to-false-capture/ (Year: 2014).*

(Continued)

*Primary Examiner* — Faris S Almatrahi
*Assistant Examiner* — David A Testardi
(74) *Attorney, Agent, or Firm* — Lerner, David, Littenberg, Krumholz & Mentlik, LLP

(57) ABSTRACT

The system for aiding the landing of an aircraft on a landing runway of an airport equipped with an Instrument Landing System ("ILS") corresponding to an axis of a predetermined approach, includes: an ILS signals receiver and a processing unit. The processing unit is configured to, when the ILS signals receiver) has not yet captured a Glide signal corresponding to a Glide axis of the approach as a function of items of information relating to the predetermined approach, acquired from a database, determine a protection volume in which there is no risk of the ILS signals receiver detecting a replica of the Glide signal; and when a current position of the aircraft is above the protection volume, inhibit the capture of the Glide signal by the ILS signals receiver and instruct the emission of an alert item of information in the cockpit of the aircraft.

7 Claims, 4 Drawing Sheets

(51) Int. Cl.
| | |
|---|---|
| *G01S 1/02* | (2010.01) |
| *G01S 1/18* | (2006.01) |
| *G08G 5/02* | (2006.01) |
| *G01S 13/91* | (2006.01) |
| *G01S 1/16* | (2006.01) |
| *G05D 1/06* | (2006.01) |

(52) U.S. Cl.
CPC .............. *G01S 1/16* (2013.01); *G01S 1/18* (2013.01); *G01S 13/913* (2013.01); *G05D 1/0676* (2013.01); *G08G 5/025* (2013.01)

(58) Field of Classification Search
CPC . G01S 19/15; G01S 1/026; G01S 1/18; G01S 13/913; G05D 1/0676; B64D 45/04; B64D 45/08
See application file for complete search history.

(56) References Cited

U.S. PATENT DOCUMENTS

| | | | | |
|---|---|---|---|---|
| 3,946,387 | A * | 3/1976 | Drucker | G01S 1/14 342/414 |
| 4,115,777 | A * | 9/1978 | Taylor | G01S 1/18 342/411 |
| 6,239,745 | B1 * | 5/2001 | Stratton | G01S 19/15 244/183 |
| 6,469,654 | B1 * | 10/2002 | Winner | G01S 3/46 342/33 |
| 7,546,183 | B1 * | 6/2009 | Marcum | G01S 1/022 340/947 |
| 2002/0040263 | A1 * | 4/2002 | Johnson | G08G 5/025 701/17 |
| 2002/0099528 | A1 * | 7/2002 | Hett | G01C 23/005 703/13 |
| 2007/0069942 | A1 * | 3/2007 | Hanneman | G01S 1/14 342/33 |
| 2008/0103644 | A1 * | 5/2008 | Oberg | G01S 1/50 701/8 |
| 2008/0297397 | A1 * | 12/2008 | Oberg | G01S 19/15 342/33 |
| 2012/0265376 | A1 * | 10/2012 | Fleiger-Holmes | G08G 5/0021 701/16 |
| 2013/0211632 | A1 * | 8/2013 | Caule | G05D 1/0676 701/3 |
| 2015/0307207 | A1 * | 10/2015 | Meunier | B62D 43/02 701/4 |
| 2016/0012735 | A1 * | 1/2016 | Koukol | G01S 1/14 701/17 |
| 2017/0124886 | A1 * | 5/2017 | Ishihara | G08G 5/025 |
| 2017/0356757 | A1 * | 12/2017 | Bourret | G08G 5/025 |
| 2018/0120850 | A1 * | 5/2018 | McLees | G08G 5/02 |
| 2018/0238708 | A1 * | 8/2018 | He | G01C 23/005 |

OTHER PUBLICATIONS

Herbert Hecht, "So Much to Learn from One Accident Crash of 737 on Feb. 25, 2009". High-Assurance Systems Engineering (HASE) 2011 IEEE 13th International Symposium on High-Assurance Systems Engineering, Nov. 10, 2011 (Nov. 10, 2011) pp. 348-351.

* cited by examiner

SYSTEM AND METHOD FOR AIDING THE LANDING OF AN AIRCRAFT

FIELD OF THE INVENTION

The invention relates to the field of the landing of an aircraft on an airport landing runway, more particularly when the airport is equipped with an instrument landing aid system.

BACKGROUND OF THE INVENTION

In order to allow the landing of aircraft, especially passenger transport aeroplanes, in particular under meteorological conditions giving rise to reduced visibility of the landing runway by pilots, numerous airports are equipped with an instrument landing aid system, also called ILS ("Instrument Landing System" in English). This ILS system is a radionavigation system making it possible to fly so-called precision approaches along an approach axis. It allows lateral guidance, as well as longitudinal guidance (slope-wise) of the aircraft. Accordingly, the airport is equipped with the two sets of antennas, emitting signals respectively called Loc and Glide. As represented in FIG. 1A, the Loc signal is emitted by a set of antennas 100 generally installed in proximity to an end 102 of the landing runway 101. These antennas emit a first VHF ("Very High Frequency") carrier whose frequency generally lies between 108 MHz and 112 MHz. This first carrier is emitted according to two lobes 104 and 106. It is modulated by two low-frequency signals, respectively at 90 Hz and 150 Hz, corresponding to the two lobes 104 and 106. To be able to carry out an approach with a view to a landing on the landing runway with the aid of the ILS system, an aircraft must be equipped with a landing aid system comprising an ILS signals receiver. This ILS signals receiver makes it possible to receive the first VHF carrier. The two lobes 104 and 106 are emitted by the set of antennas 100 in such a way that a modulation rate, resulting from their superposition, makes it possible to locate the position of the aircraft with respect to a vertical plane containing the approach axis 108, as a function of signals received by the ILS signals receiver: when the aircraft is situated on the right (in its direction of advance) of the vertical plane, the modulation at 90 Hz prevails; when the aircraft is situated on the left (in its direction of travel) of the vertical plane, the modulation at 150 Hz prevails; when the aircraft is situated on the vertical plane, the modulations at 90 Hz and at 150 Hz are in balance. The aircraft is equipped with a system for aiding guidance comprising a guidance mode Loc. When on the one hand this guidance mode Loc is activated (or engaged) by a pilot of the aircraft and on the other hand the Loc signal is captured by the ILS signals receiver, this system for aiding guidance makes it possible to aid the guidance of the aircraft as a function of the signals received by the ILS signals receiver so as to bring the lateral component of its trajectory into the vertical plane containing the approach axis 108.

In an analogous manner, as represented in FIG. 1B, the Glide signal is emitted by a set of antennas 120 generally installed in proximity to a threshold 122 of the landing runway. These antennas emit a second VHF ("Very High Frequency") carrier whose frequency generally lies between 329 MHz and 335 MHz. This second carrier is emitted according to two lobes 124 and 126. It is modulated by two low-frequency signals, respectively at 90 Hz and 150 Hz, corresponding to the two lobes 124 and 126. The ILS signals receiver of the aircraft makes it possible to receive the second VHF carrier. The two lobes 124 and 126 are emitted by the set of antennas 120 in such a way that a modulation rate, resulting from their superposition, makes it possible to locate the position of the aircraft with respect to an inclined plane (orthogonal to the aforementioned vertical plane) containing the approach axis 108, as a function of signals received by the ILS signals receiver: when the aircraft is situated above the inclined plane, the modulation at 90 Hz prevails; when the aircraft is situated below the inclined plane, the modulation at 150 Hz prevails; when the aircraft is situated on the inclined plane, the modulations at 90 Hz and at 150 Hz are in balance. The system for aiding the guidance of the aircraft comprises a guidance mode Glide. When on the one hand this guidance mode Glide is activated (or engaged) by a pilot of the aircraft and on the other hand the Glide signal is captured by the ILS signals receiver, the system for aiding guidance makes it possible to aid the guidance of the aircraft as a function of the signals received by the ILS signals receiver so as to cause the slope of the longitudinal component of the trajectory of the aircraft to correspond to the inclined plane containing the approach axis 108. The slope of the approach axis 108, and therefore of the inclined plane, is generally 3 degrees.

The approach axis 108 corresponds to the intersection of the aforementioned vertical plane and of the aforementioned inclined plane. Thus, the Loc signal makes it possible to define a component Loc of the approach axis (also called Loc axis), corresponding to the vertical plane, and the Glide signal makes it possible to define a component Glide of the approach axis (also called Glide axis), corresponding to the inclined plane. The system for aiding the guidance of the aircraft, by allowing guidance of the aircraft at one and the same time according to the component Loc and according to the component Glide of the approach axis, makes it possible to guide the aircraft along the approach axis 108. In one embodiment, the system for aiding the guidance of the aircraft corresponds to a flight director displaying indications on a display screen of the cockpit of the aircraft, allowing a pilot of the aircraft to fly the aircraft in such a way as to follow the approach axis. In another embodiment, the system for aiding the guidance of the aircraft corresponds to automatic piloting system of the aircraft.

Such an ILS system is very effective for allowing the landing of an aircraft on a landing runway in case of reduced visibility. However, it exhibits a limitation in its operation on account of the fact that a replication of the signals emitted by the ground antennas may sometimes exist. In particular, the Glide signal may be replicated with slopes which are multiples of the slope of the approach axis. This results in false Glide axes possibly being detected and captured by the system for aiding the guidance of the aircraft. For example, as represented in FIG. 2, for a slope of the approach axis 108 of 3 degrees, a replica of the Glide axis 108' may exist having a slope of different value from the nominal value of 3 degrees, for example 9 degrees. The signal corresponding to the replica of the Glide axis comprises two lobes 124' and 126' inverted with respect to the lobes 124 and 126 of the main Glide signal corresponding to the slope of 3 degrees. This results in a modulation at 90 Hz below the false Glide axis and a modulation at 150 Hz above the false Glide axis. Consequently, if a pilot of the aircraft requests the activation of an ILS guidance mode whilst the aircraft is in proximity to the Glide axis replica and below the latter, the modulation at 90 Hz being predominant with respect to the modulation at 150 Hz, the system for aiding guidance will allow descent-wise guidance of the aircraft and the aircraft will end up joining the approach axis 108. On the other hand, if a pilot of the aircraft requests the activation of an ILS guidance mode whilst the aircraft is in proximity to the Glide axis replica and above the latter, the modulation at 150 Hz being predominant with respect to the modulation at 90 Hz, the system for aiding guidance will allow climb-wise guidance of the aircraft and the aircraft will not be able to join the approach axis 108. This may result in the necessity for a go-around manoeuvre so as to fly a new approach to the landing runway.

BRIEF SUMMARY OF THE INVENTION

Aspects of the present invention may afford a solution to these problems. It relates to a system for aiding the landing of an aircraft on a landing runway of an airport equipped with a so-called ILS instrument landing system, this ILS system corresponding to an axis of a predetermined approach to the landing runway, the landing aid system comprising:
  an ILS signals receiver;
  a set of information sources configured to determine items of information in respect of current position of the aircraft; and
  a database comprising items of information relating to the said predetermined approach.

The landing aid system is noteworthy in that it furthermore comprises a processing unit configured to, when the ILS signals receiver has not yet captured a Glide signal corresponding to a Glide axis of the approach:
  acquire, from the set of information sources, an item of information in respect of current position of the aircraft;
  acquire, from the database, items of information relating to the predetermined approach;
  determine, as a function of the items of information relating to the predetermined approach, a protection volume in which there is no risk of the ILS signals receiver detecting a replica of the Glide signal;
  determine whether the current position of the aircraft is above the protection volume; and
  when the current position of the aircraft is above the protection volume, inhibit the capture of the Glide signal by the ILS signals receiver and instruct the emission of an alert item of information in the cockpit of the aircraft.

The system makes it possible to facilitate the work task of a pilot of the aircraft during a phase of descent of the aircraft with a view to its landing on the landing runway. The landing being carried out within the framework of a predetermined approach (in particular a published approach) using the airport's ILS system to guide the aircraft towards the landing runway, the system makes it possible to avoid the capture of a replica of the Glide axis by the ILS signals receiver of the aircraft. Indeed, when the current position of the aircraft is above the protection volume, the system inhibits the capture of the Glide signal, in such a way that the aircraft does not risk being guided as a function of the said replica of the Glide axis. When the current position of the aircraft is in the protection volume, there is no risk of the ILS signals receiver capturing ILS signals corresponding to a replica of the ILS axis: consequently, the capture of the ILS axis can be carried out without the pilot needing to monitor a risk of capturing a replica of the Glide axis.

In one embodiment, the processing unit is configured to determine the protection volume as comprising an upper limit corresponding to a predetermined approach slope to the landing runway, this predetermined approach slope being equal to the slope of a replica of the Glide axis minus a margin. In an advantageous manner, the said margin is a predetermined margin defined in such a way that there is no risk of the ILS signals receiver detecting the replica of the Glide signal when the current position of the aircraft is situated in the protection volume.

In a particular embodiment, the set of information sources comprises a receiver of satellite navigation data and a barometric altitude measurement system.

The invention also relates to a method for aiding the landing of an aircraft on a landing runway of an airport equipped with a so-called ILS instrument landing system, this ILS system corresponding to an axis of a predetermined approach to the landing runway, the aircraft comprising:
  an ILS signals receiver;
  a set of information sources configured to determine items of information in respect of current position of the aircraft; and
  a database comprising items of information relating to the said predetermined approach.

This method is noteworthy in that it comprises the following steps implemented by a processing unit when the ILS signals receiver has not yet captured the Glide signal:
  acquire, from the set of information sources, an item of information in respect of current position of the aircraft;
  acquire, from the database, items of information relating to the predetermined approach;
  determine, as a function of the items of information relating to the predetermined approach, a protection volume in which there is no risk of the ILS signals receiver detecting a replica of the Glide signal;
  determine whether the current position of the aircraft is above the protection volume; and
  when the current position of the aircraft is above the protection volume, inhibit the capture of the Glide signal by the ILS signals receiver and instruct the emission of an alert item of information in the cockpit of the aircraft.

In one embodiment, in the step of determining the protection volume, the protection volume is determined as comprising an upper limit corresponding to a predetermined approach slope to the landing runway, this predetermined approach slope being equal to the slope of a replica of the Glide axis minus a margin. In an advantageous manner, the said margin is a predetermined margin defined in such a way that there is no risk of the ILS signals receiver detecting the replica of the Glide signal when the current position of the aircraft is situated in the protection volume.

In a particular embodiment, in the step of acquiring the item of information in respect of current position of the aircraft, the item of information in respect of current position of the aircraft is acquired in part from a receiver of satellite navigation data and in part from a barometric altitude measurement system.

The invention also relates to an aircraft comprising a landing aid system such as aforementioned.

BRIEF DESCRIPTION OF THE DRAWINGS

The invention will be better understood on reading the description which follows and on examining the appended figures.

DETAILED DESCRIPTION

Figure 5:
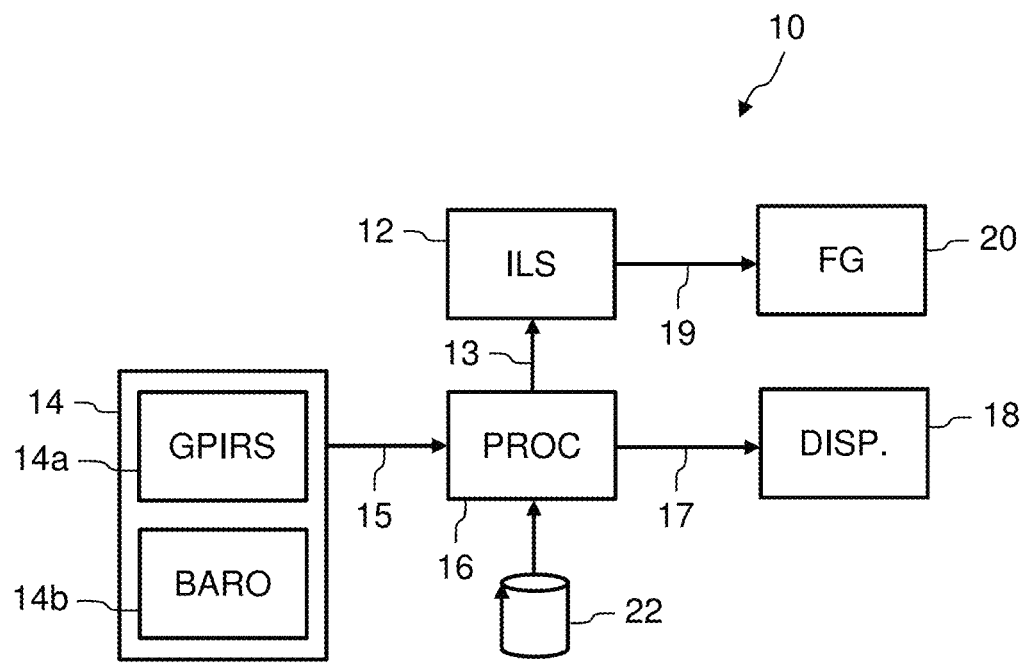
FIG. 5 represents, in a schematic manner, a landing aid system in accordance with an embodiment of the invention.
Figure 6:
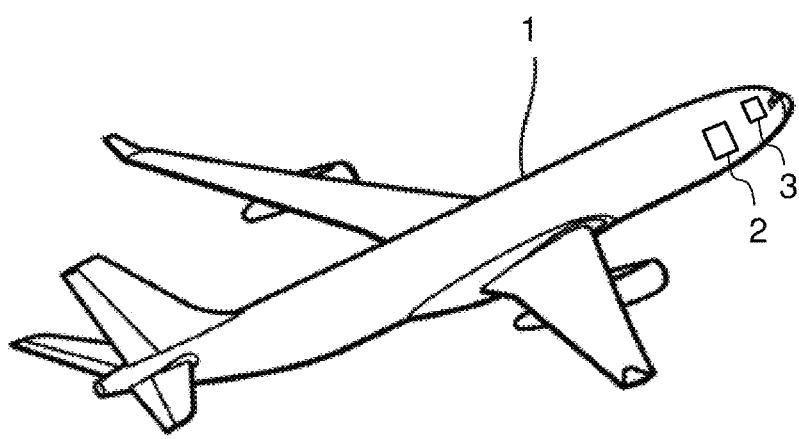
FIG. 6 illustrates in a simplified manner an aircraft comprising a cockpit.

The aircraft 1 represented in FIG. 6 comprises a cockpit 3. The aircraft 1 comprises a landing aid system 10 such as represented in FIG. 5. The landing aid system 10 comprises an ILS signals receiver 12 (labelled ILS in the figure), a set of information sources 14, a display device 18 of the cockpit 3 of the aircraft and a processing unit 16 (labelled PROC in the figure). The aircraft also comprises a guidance system 20 (labelled FG in the figure). The processing unit 16 is connected at input to an output of the set of information sources 14, by a link 15. The display device 18 is connected at input to an output of the processing unit 16, by a link 17. The ILS signals receiver is connected at input to an output of the processing unit 16, by a link 13. The guidance system 20 is connected at input to an output of the ILS signals receiver 12, by a link 19. The processing unit 16 is also connected at input to a database 22. In a particular embodiment, the set of information sources 14 comprises a GPIRS ("Global Positioning/Inertial Reference System") system 14a capable of providing items of information in respect of position of the aircraft as well as a barometric altitude measurement system 14b (labelled BARO in the figure). The processing unit 16 comprises a processor or a microprocessor. In a particular manner, it forms part of a computer of the aircraft, this computer being for example a dedicated computer of LRU ("Line Replaceable Unit") type or an avionics modular computer of IMA ("Integrated Modular Avionics") type. In one embodiment, the processing unit forms part of a guidance computer of the aircraft, corresponding in an advantageous manner to the guidance system 20. This guidance computer is for example connected at output to a flight director (instructing the display of indications on a display screen of the cockpit 3 of the aircraft) or to an automatic piloting system of the aircraft. The display device 18 corresponds for example to a display screen of PFD ("Primary Flight Display") type. The landing aid system 10 is for example located in an avionics bay 2 of the aircraft. The database 22 contains information relating to various predetermined approaches, for example published approaches mentioned on cards used by aircraft pilots to land on airport landing runways. In one embodiment, the database 22 is integrated into a guidance computer of the aircraft 1, in particular a computer of FMS ("Flight Management System") type. In another embodiment, the database 22 is hosted on a server of the aircraft.

Figure 1A:
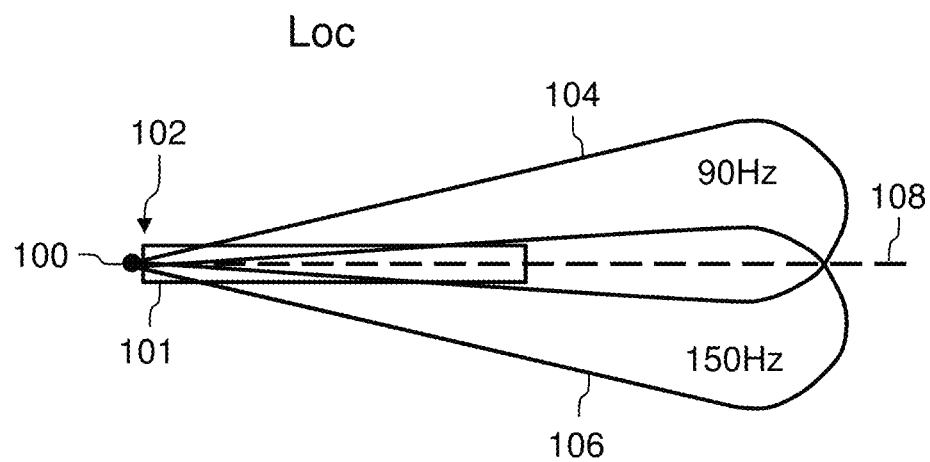
FIGS. 1A and 1B, already described, illustrate an ILS instrument landing aid system.
Figure 1B:
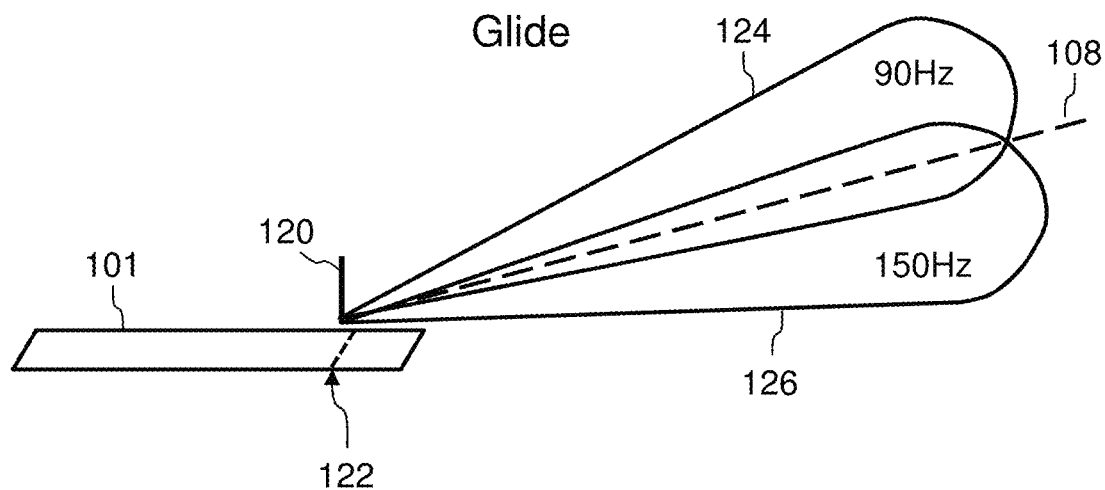
Figure 2:
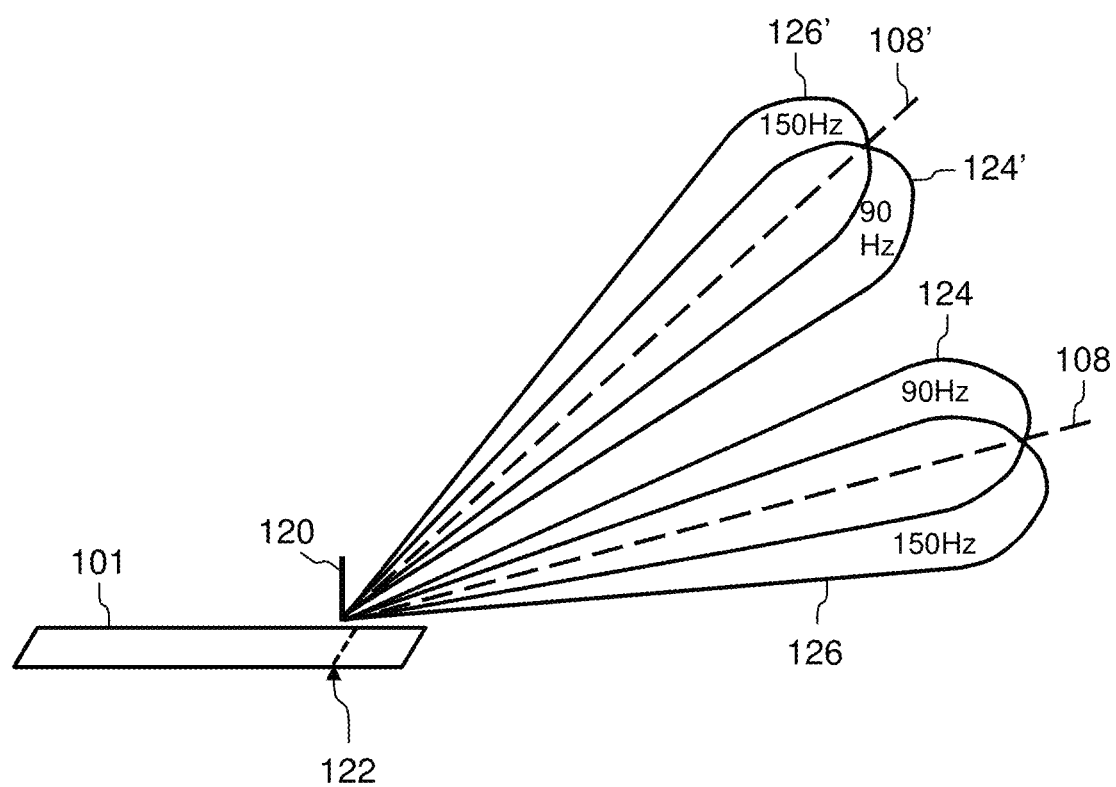
FIG. 2, already described, illustrates the replication of a Glide signal of an ILS instrument landing aid system.
Figure 3:
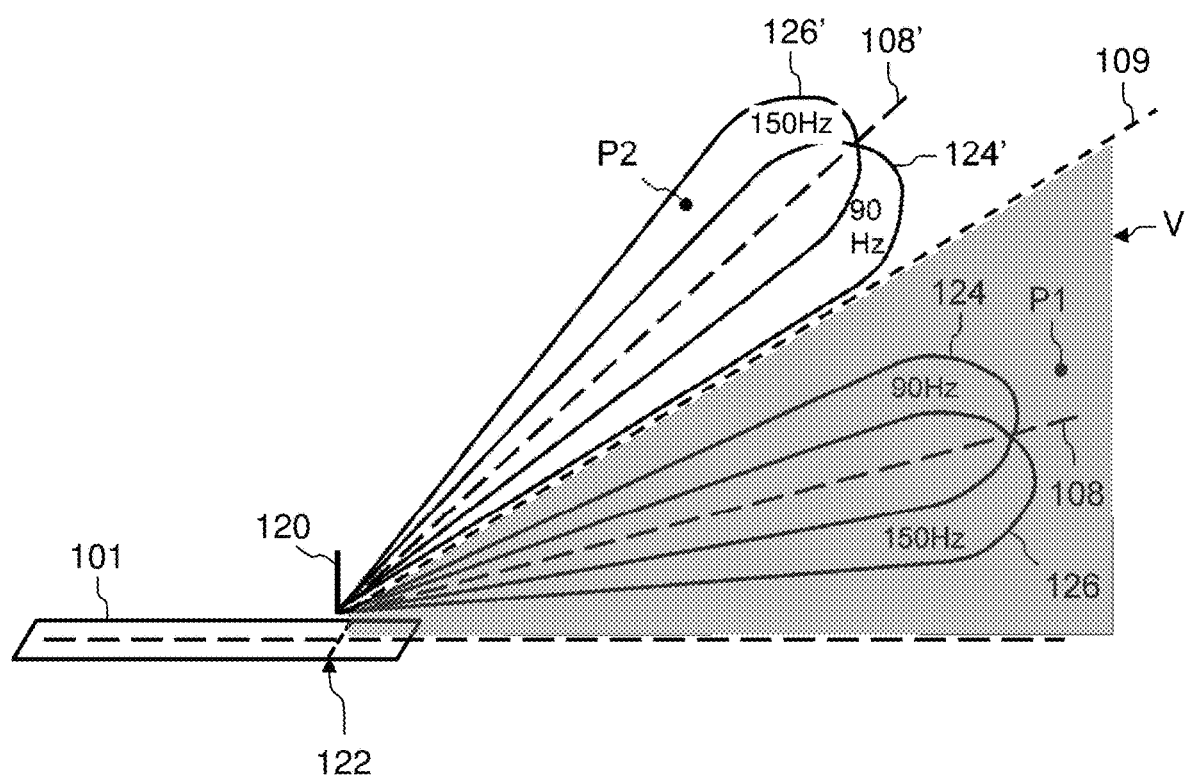
FIGS. 3 and 4 illustrate embodiments of the invention.

During operation, the set of information sources 14 determines in a repetitive manner items of information in respect of current position of the aircraft. When the aircraft is in the phase of descent towards an airport with a view to landing on a landing runway 101 of the airport according to a predetermined approach (in particular a published approach) to the said landing runway, the processing unit 16 acquires at least one of the said items of information in respect of current position of the aircraft via the link 15. In a particular manner, the processing unit 16 acquires a first item of information arising from the GPIRS system 14a and a second item of information arising from the barometric altitude measurement system 14b. The processing unit uses the first item of information to determine the coordinates of the current position of the aircraft in projection in a horizontal plane and it uses the second item of information to determine the altitude corresponding to the current position of the aircraft. The processing unit 16 also acquires, from the database 22, items of information relating to the predetermined approach. These items of information correspond for example to the coordinates of the point of intersection with the ground of the approach axis 108 (such as illustrated in FIG. 3) corresponding to the said approach, as well as the orientation and the slope of the approach axis. As a function of the items of information relating to the predetermined approach, the processing unit determines a protection volume V in which there is no risk of the ILS signals receiver 12 detecting a replica of the Glide signal. As indicated previously, such a replica of the Glide signal corresponds to a false Glide axis 108' whose slope is a multiple of the slope of the approach axis 108. A frequent case of replica of the Glide signal corresponds to a false Glide axis 108' (also called replica of the Glide axis) whose slope is triple the slope of the approach axis 108. Without the invention being limited to this value, the slope of the approach axis 108 is for example 3 degrees. In such a case, the triple slope of the false Glide axis 108' is 9 degrees. As already indicated with reference to FIG. 2, the signal corresponding to the replica of the Glide signal comprises two lobes 124' and 126' defining the false Glide axis 108'. The protection volume V is determined in such a way as to be situated below the two lobes 124' and 126'. Thus, when the current position of the aircraft is in the protection volume V, there is no risk of the ILS signals receiver 12 detecting the signals corresponding to these two lobes.

In a particular embodiment, the protection volume V comprises an upper limit 109 corresponding to a predetermined approach slope to the landing runway, this predetermined approach slope being equal to the slope of the replica 108' of the Glide axis minus a margin. This predetermined margin is defined in such a way that there is no risk of the ILS signals receiver 12 detecting the replica of the Glide signal, corresponding to the two lobes 124' and 126', when the current position of the aircraft is situated in the protection volume V. In the example considered of an approach axis 108 whose slope is equal to 3 degrees, corresponding to a replica 108' of the Glide axis of slope equal to 9 degrees, a predetermined margin of 2 degrees makes it possible to avoid the detection of the replica of the Glide signal by the ILS signals receiver 12. The upper limit 109 of the protection volume V then corresponds to an approach slope to the landing runway equal to 7 degrees. In an advantageous manner, for a slope of the replica 108' of the Glide axis equal to 9 degrees, the approach slope corresponding to the upper limit 109 of the protection volume is chosen in an interval from 5 to 8 degrees (corresponding to a predetermined margin of between 4 degrees and 1 degree).

In a particular manner, the upper limit 109 of the protection volume V corresponds to a plane inclined according to the said predetermined slope (for example equal to 7 degrees), this inclined plane being perpendicular to a vertical plane containing the approach axis 108.

The processing unit 16, knowing the current position of the aircraft, determines whether the current position of the aircraft is above the protection volume V. If the current position of the aircraft is above the protection volume V, such as for example the position P2 represented in FIG. 3, the processing unit 16 instructs the inhibition of the capture of the Glide signal by the ILS signals receiver 12 and it also instructs the emission of an alert item of information in the cockpit 3 of the aircraft. Thus, there is no risk of the ILS signals receiver 12 capturing the signals of the two lobes 124' and 126' corresponding to the replica 108' of the Glide axis. Consequently, the receiver 12 does not capture the replica 108' of the Glide axis. The display of the alert in the cockpit makes it possible to inform a pilot of the aircraft that it is not possible to capture the approach axis 108. The pilot can then anticipate the appropriate piloting actions, for example a go-around with a view to carrying out a new approach. The display of the alert corresponds for example to the display of a "TOO HIGH" indication in red on a primary piloting screen of PFD ("Primary Flight Display") type of the cockpit 3. In an advantageous manner, an audio alert is associated with this display. If the current position of the aircraft is in the protection volume V, such as for example the position P1 represented in FIG. 3, the processing unit 16 does not instruct the inhibition of the capture of the Glide signal by the ILS signals receiver 12. Consequently, the receiver 12 can capture the Glide axis 108 when it receives the signals of the lobes 124 and 126.

Figure 4:
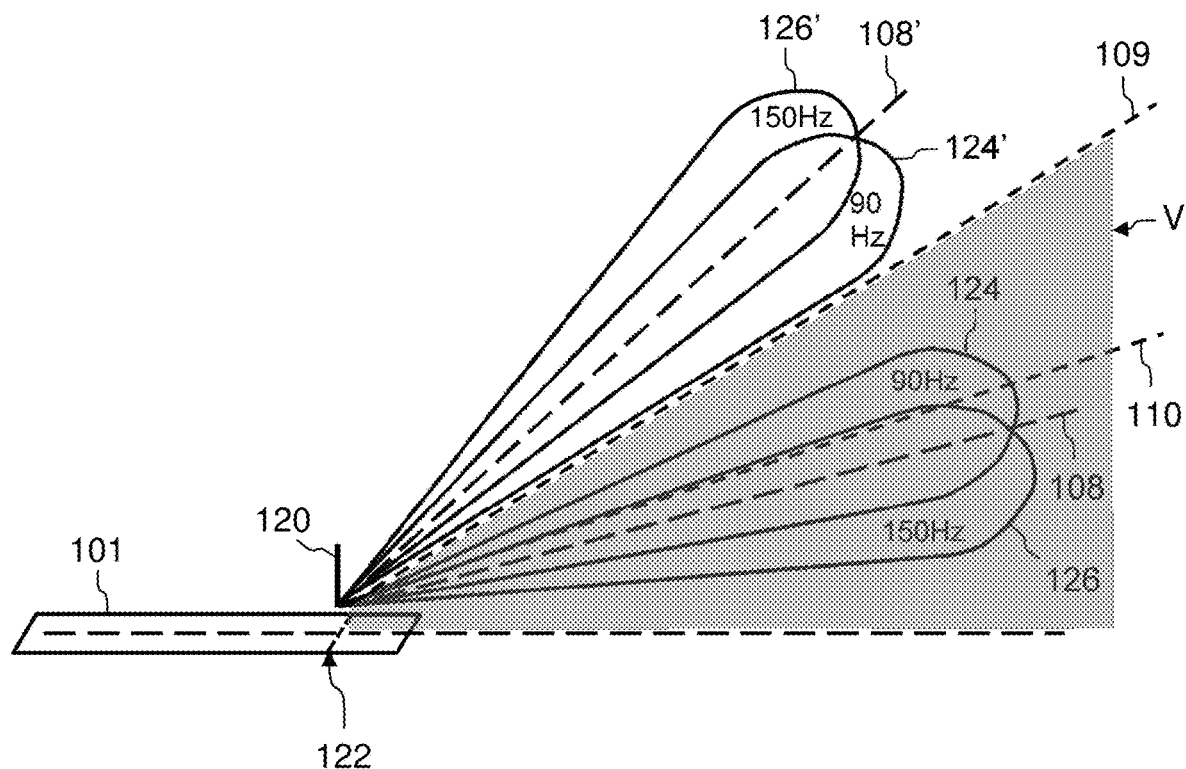

In an advantageous embodiment illustrated by FIG. 4, the ILS signals receiver 12 determines, as a function of the ILS signals received, whether the current position of the aircraft is above an approach axis 110 whose slope corresponds to the slope of the approach axis 108, increased by a margin. For a slope of the approach axis 108 equal to 3 degrees, the slope of the approach axis 110 is for example chosen equal to 3.4 degrees (corresponding to +1.5 dot with respect to the Glide axis on a Glide display scale of a PFD screen of the cockpit of the aircraft). When the current position of the aircraft is above the axis 110, the ILS signals receiver instructs the display of an alert on the PFD screen (for example an "ABOVE GLIDE" text) so as to inform a pilot of the aircraft that the aircraft is above the Glide axis.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A system for aiding the landing of an aircraft on a landing runway of an airport equipped with an Instrument Landing System ("ILS"), the ILS system corresponding to an axis of a predetermined approach to the landing runway, the landing aid system comprising:
   an ILS signals receiver;
   a set of information sources configured to determine items of information in respect of current position of the aircraft; and
   a database comprising items of information relating to the said predetermined approach,
   wherein the landing aid system further comprises a processing unit configured to, when the ILS signals receiver has not yet captured a Glide signal corresponding to a Glide axis of the approach:
      acquire, from the set of information sources, an item of information in respect of current position of the aircraft;
      acquire, from the database, items of information relating to the predetermined approach;
      determine, as a function of the items of information relating to the predetermined approach, a protection volume comprising an upper limit corresponding to a predetermined approach slope to the landing runway, the predetermined approach slope determined as being equal to the slope of a replica of the Glide axis minus a predetermined margin, wherein the slope of the replica corresponds to a multiple of the slope of the Glide axis;
      determine whether the current position of the aircraft is above the protection volume; and
      when the current position of the aircraft is above the protection volume, inhibit the capture of the Glide signal by the ILS signals receiver and instruct the emission of an alert item of information in the cockpit of the aircraft.

2. The system according to claim 1, wherein said margin is a predetermined margin defined in such a way that detecting of the replica of the Glide signal by the ILS signals receiver is avoided when the current position of the aircraft is situated in the protection volume.

3. The system according to claim 1, wherein the set of information sources comprises a receiver of satellite navigation data and a barometric altitude measurement system.

4. An aircraft comprising a landing aid system according to claim 1.

5. A method for aiding the landing of an aircraft on a landing runway of an airport equipped with an Instrument Landing System ("ILS"), the ILS system corresponding to an axis of a predetermined approach to the landing runway, the aircraft comprising:
   an ILS signals receiver;
   a set of information sources configured to determine items of information in respect of current position of the aircraft; and
   a database comprising items of information relating to the said predetermined approach,
   wherein the method comprises the following steps implemented by a processing unit when the ILS signals receiver has not yet captured the Glide signal:
      acquire, from the set of information sources, an item of information in respect of current position of the aircraft;
      acquire, from the database, items of information relating to the predetermined approach;
      determine, as a function of the items of information relating to the predetermined approach, a protection volume comprising an upper limit corresponding to a predetermined approach slope to the landing runway, the predetermined approach slope determined as being equal to the slope of a replica of the Glide axis minus a predetermined margin, wherein the slope of the replica corresponds to a multiple of the slope of the Glide axis;
      determine whether the current position of the aircraft is above the protection volume; and
      when the current position of the aircraft is above the protection volume, inhibit the capture of the Glide signal by the ILS signals receiver and instruct the emission of an alert item of information in the cockpit of the aircraft.

6. The method according to claim 5, wherein the margin is a predetermined margin defined in such a way that detecting the replica of the Glide signal by the ILS signals receiver is avoided when the current position of the aircraft is situated in the protection volume.

7. The method according to claim 5, wherein in the step of acquiring the item of information in respect of current position of the aircraft, the item of information in respect of current position of the aircraft is acquired in part from a receiver of satellite navigation data and in part from a barometric altitude measurement system.

\* \* \* \* \*